US012304107B2

(12) United States Patent
Stefani et al.

(10) Patent No.: US 12,304,107 B2
(45) Date of Patent: May 20, 2025

(54) METHOD FOR REALISING A CERAMIC SLAB

(71) Applicant: SYSTEM CERAMICS S.P.A., Fiorano Modenese (IT)

(72) Inventors: Franco Stefani, Sassuolo (IT); Franco Gozzi, Formigine (IT); Paolo Vaccari, Modena (IT); Ivan Ghirelli, Castellarano (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 222 days.

(21) Appl. No.: 17/997,753

(22) PCT Filed: Jun. 9, 2021

(86) PCT No.: PCT/IB2021/055060
§ 371 (c)(1),
(2) Date: Nov. 2, 2022

(87) PCT Pub. No.: WO2021/250586
PCT Pub. Date: Dec. 16, 2021

(65) Prior Publication Data

US 2023/0219255 A1 Jul. 13, 2023

(30) Foreign Application Priority Data

Jun. 9, 2020 (IT) ........................ 102020000013792

(51) Int. Cl.
*B28B 13/02* (2006.01)
*B28B 1/00* (2006.01)
(Continued)

(52) U.S. Cl.
CPC ............ *B28B 13/022* (2013.01); *B28B 1/005* (2013.01); *B28B 5/021* (2013.01);
(Continued)

(58) Field of Classification Search
CPC .................................................... B28B 13/022
See application file for complete search history.

(56) References Cited

U.S. PATENT DOCUMENTS 6,391,236 B1 5/2002 Franceschini
6,669,008 B2 12/2003 Giovanardy
(Continued)

FOREIGN PATENT DOCUMENTS

CN 101804664 8/2010
CN 106311061 1/2017
(Continued)

OTHER PUBLICATIONS

Office action issued in Chinese Patent Application No. 2021800366016 on Jun. 12, 2024, 8 pages.

*Primary Examiner* — Timothy Kennedy
(74) *Attorney, Agent, or Firm* — Chrisman Gallo Tochtrop LLC

(57) ABSTRACT

A method for realising a ceramic slab, comprising the following steps: arranging on a first deposition plane (50) a decorated layer (L2) provided with a decoration (200), gradually depositing the decorated soft layer (L2) from a head (H) to a tail (T); gradually transferring the soft layer (L2) by deposition from the first deposition plane (50) to a second deposition plane (83), placed at a lower height than the first deposition plane (50), starting from the tail (T) of the second soft layer (L2), gradually realising a second layer (L3) on the second deposition plane (83).

9 Claims, 8 Drawing Sheets

(51) Int. Cl.

| | |
|---|---|
| ***B28B 5/02*** | (2006.01) |
| ***B28B 17/00*** | (2006.01) |
| ***B44C 5/04*** | (2006.01) |
| ***B44F 9/04*** | (2006.01) |
| ***E04F 13/14*** | (2006.01) |
| ***E04F 15/08*** | (2006.01) |

(52) U.S. Cl.
CPC ............ *B28B 17/0081* (2013.01); *B44C 5/04* (2013.01); *B44F 9/04* (2013.01); *E04F 13/147* (2013.01); *E04F 15/08* (2013.01)

(56) References Cited

U.S. PATENT DOCUMENTS

| | | | |
|---|---|---|---|
| 9,186,819 | B1 * | 11/2015 | Grzeskowiak, II ... B28B 13/022 |
| 11,167,445 | B2 | 11/2021 | Stefani |
| 11,389,773 | B2 | 7/2022 | Qiu et al. |
| 2002/0014713 | A1 | 2/2002 | Giovanardy |
| 2005/0213429 | A1 | 9/2005 | Izzo |
| 2008/0113123 | A1 | 5/2008 | Izzo |
| 2018/0250846 | A1 | 9/2018 | Stefani |
| 2019/0176113 | A1 | 6/2019 | Qiu et al. |
| 2021/0268686 | A1 * | 9/2021 | Tarozzi .................. B28B 1/005 |
| 2021/0379794 | A1 | 12/2021 | Vaccari et al. |
| 2022/0323988 | A1 * | 10/2022 | Ghirelli .............. B28B 13/0215 |

FOREIGN PATENT DOCUMENTS

| | | | | |
|---|---|---|---|---|
| CN | 209585494 | | 11/2019 | |
| CN | 1334229 | | 2/2022 | |
| EP | 2065150 | A1 * | 6/2009 | ............ B28B 1/005 |
| EP | 3659769 | A1 | 6/2020 | |
| IT | 201800010922 | A1 | 6/2020 | |
| WO | WO-0172489 | A2 * | 10/2001 | .......... B05B 7/1495 |
| WO | 2017051275 | A1 | 3/2017 | |
| WO | 2020/121098 | A1 | 6/2020 | |
| WO | 2020121101 | A1 | 6/2020 | |

* cited by examiner

METHOD FOR REALISING A CERAMIC SLAB

The present invention relates to a method for realising a ceramic slab. Over the years, the evolution of the ceramic production process has led to the realisation of ceramic tiles, initially used exclusively for coatings and floors, which are increasingly larger and with variable thicknesses. The increase in the size of the classic ceramic tile has led to the identification of the product realised by the new production processes with the term ceramic slab precisely by virtue of the greater dimensions realised, which can reach 1800 mm wide up to 4800 mm long with thicknesses up to 30 mm. The term ceramic slab is intended as equivalent to ceramic tile.

In the production of ceramic tiles or ceramic slabs, the realisation of decorations which reproduce natural stones or wood is frequently requested. As is known, such materials have veining which extends throughout the mass. This means that, when machined into slabs, the veining extends from the outer surfaces throughout the thickness, also being visible on the side surfaces of the slabs. Such a veining effect is particularly sought after for the realisation of kitchen or bathroom tops, steps, walls or edges, in general for the realisation of finishes in which the side surfaces are also visible for the entire thickness of the slabs.

The application or realisation of the decoration essentially occurs according to a process which involves simultaneously laying, through a special decorating device, a soft layer already provided with a decoration in thickness realised in soft material. The laying of the decorated layer involves a motion from the top downwards and a relative motion, directed horizontally, between the decoration or decorated layer and a deposition plane.

In essence, the soft layer, already provided with decoration, is laid by the decorating device on an underlying deposition plane. A relative motion is realised between the decorating device and the deposition plane. For example, the source of the decoration, i.e., the decorating device, is stationary, while the deposition plane is moving.

In both cases, the relative motion between the decoration source and the deposition plane produces, on a vertical plane parallel to the direction of the relative motion, an inclination of the decoration. In essence, observing the decorated ceramic slab on a side surface parallel to the direction of relative motion, the veining is all inclined in the same manner, parallel to each other, in an unnatural manner, with angles comprised between about 15° and 20°. Another production process exists which involves realising the decorations or veining using a sort of pen, movable along two horizontal Cartesian axes, structured to deposit the decoration material directly into the thickness of the soft layer already deposited, substantially passing through the latter. However, such a process is characterised by rather low productivity. Moreover, the decorations or veining, observed on a side surface parallel to the direction of relative motion, is almost vertical, offering a rather unnatural appearance.

The object of the present invention is to offer a method for realising a ceramic slab which allows the production of ceramic slabs free of the drawbacks of the ceramic slabs currently available.

The main advantage of the method according to the present invention is to realise at least one decoration which extends at least partly in the thickness of the body and at least partly on one of the two faces of the ceramic slab and which, when viewed on a side surface of the slab, has an inclination comprised between about 40° and 80°, offering a natural appearance, completely similar to natural stone or wood.

Furthermore, the inclination conferred to the decoration gives it considerable stability with respect to the displacement steps and the pressing step envisaged in the production cycle. In particular, being able to modify the inclination with angles comprised between 40° and 80°, preferably comprised between 60° and 80°, for example 70°, allows to maintain a greater stability of the soft layer during the displacements of the soft layer from the decoration system until reaching the press, obtaining the final product as desired. In other words, an inclination of the vein between 40° and 80°, preferably comprised between 60° and 80°, for example 70°, allows to obtain greater structural stability of the vein itself within the soft layer during the displacements envisaged by the production cycle. Thereby the vein does not break down inside the soft layer during transport and the soft layer maintains the geometric features thereof.

Being able to select the inclination with angles greater than 40° also allows to obtain finished products with optical perception features more similar to natural stones or wood.

Additional features and advantages of the present invention will become more apparent from the following detailed description of an embodiment of the invention, illustrated by way of non-limiting example in the appended figures, in which.

Figure 1:
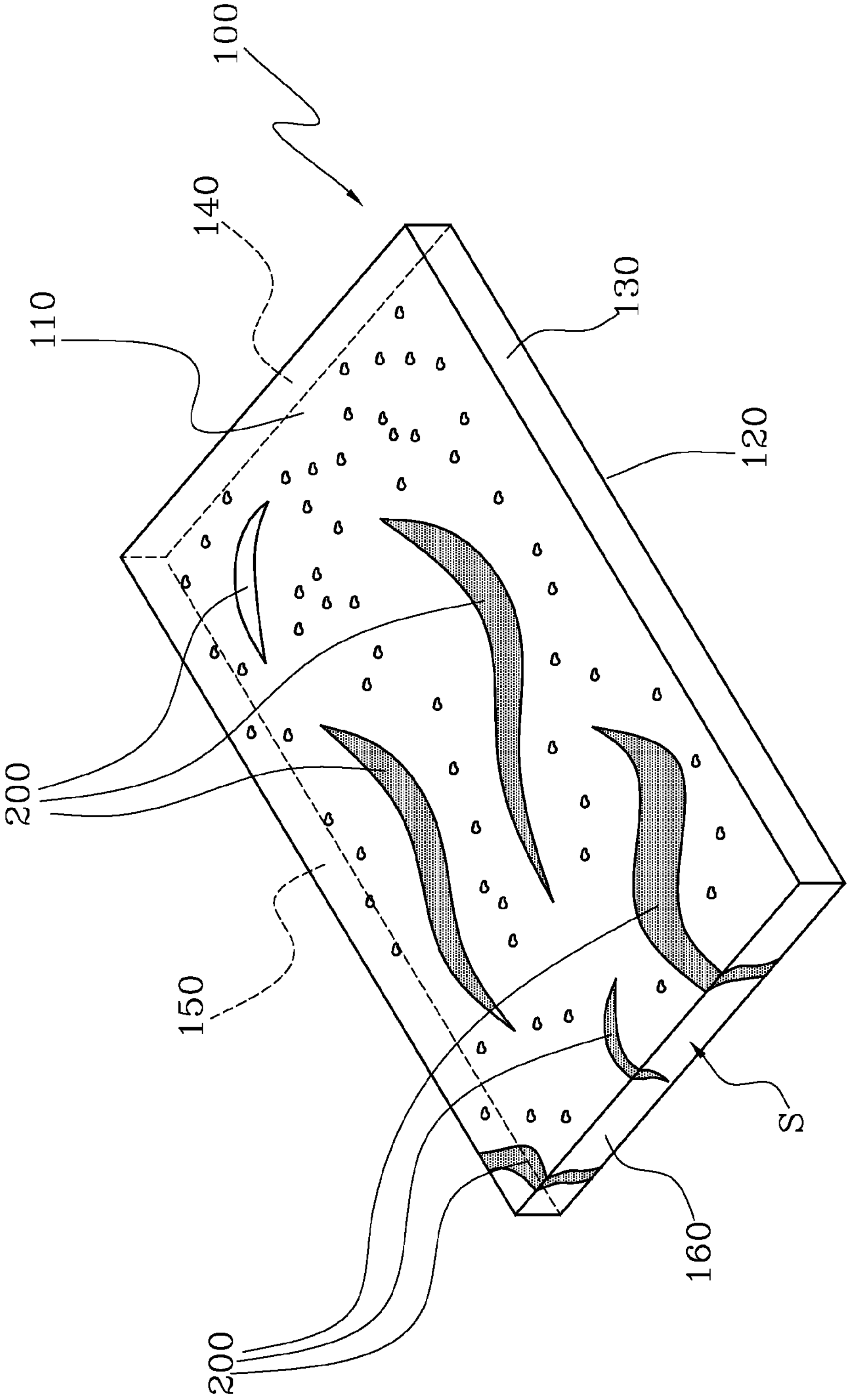
FIG. 1 is a schematic view of a ceramic slab according to the present invention.
Figure 2:
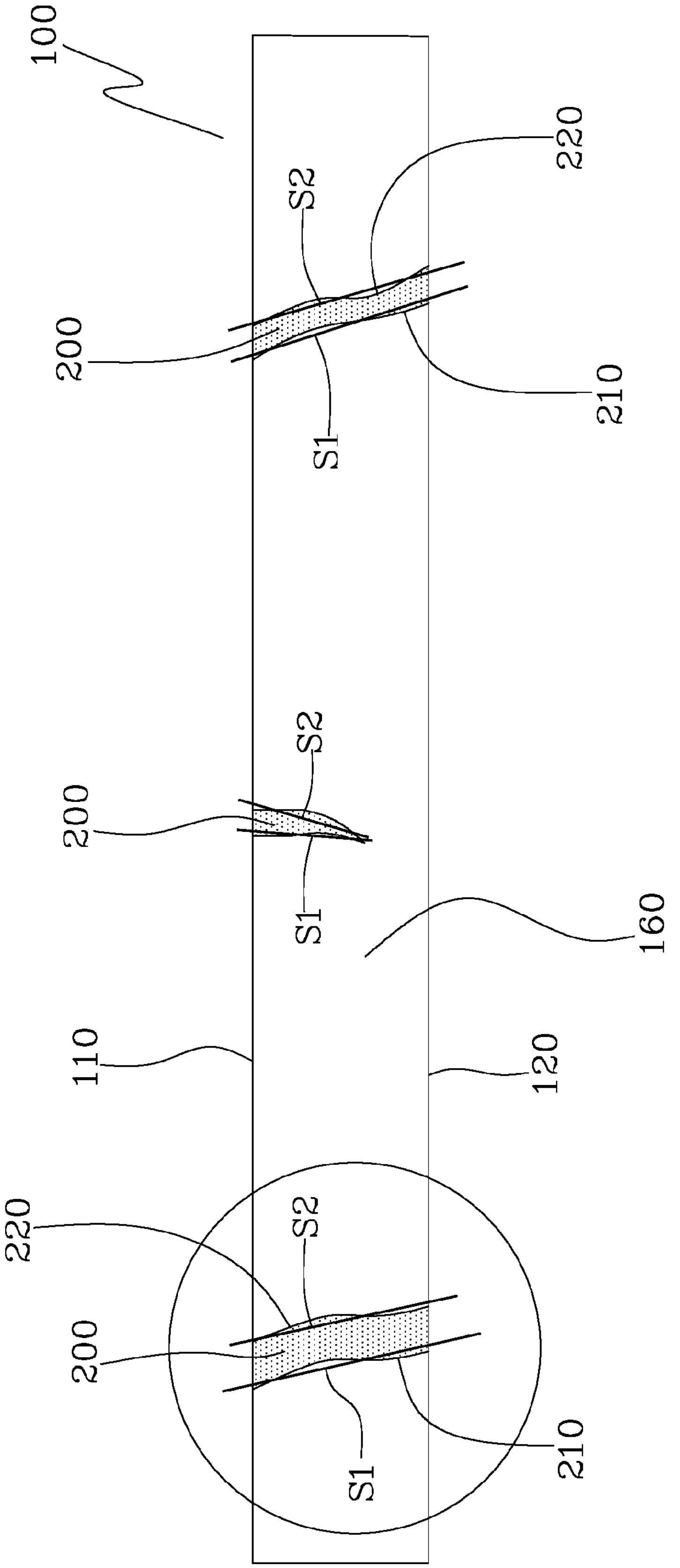
FIG. 2 is a view of a side face of the tile of FIG. 1.
Figure 2A:
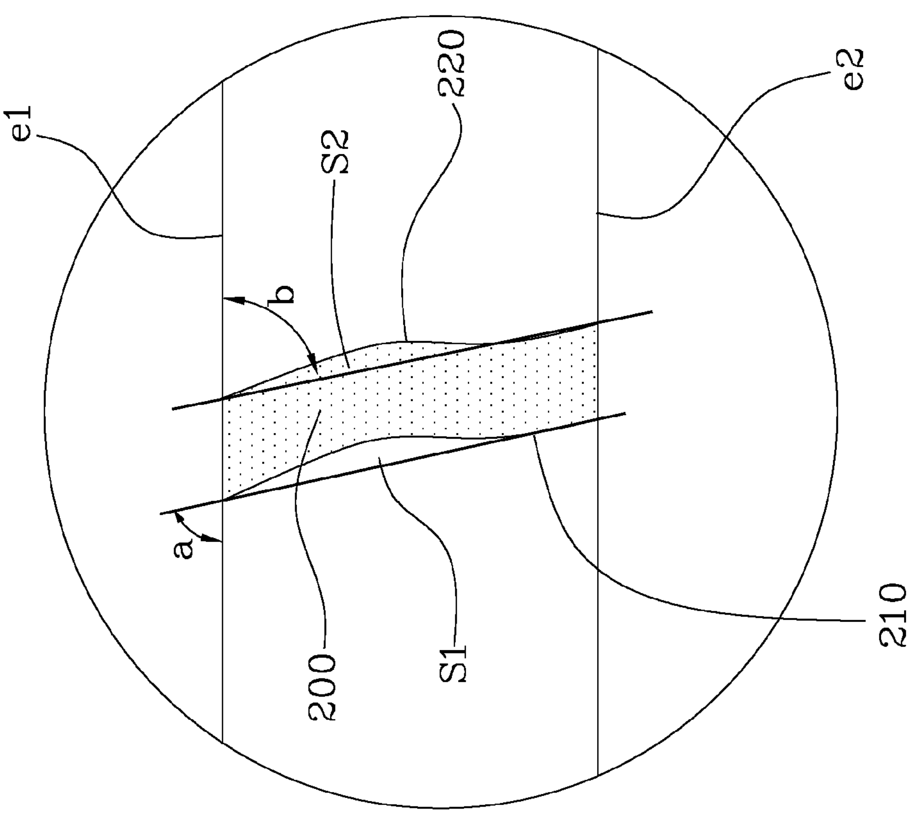
Figure 2B:
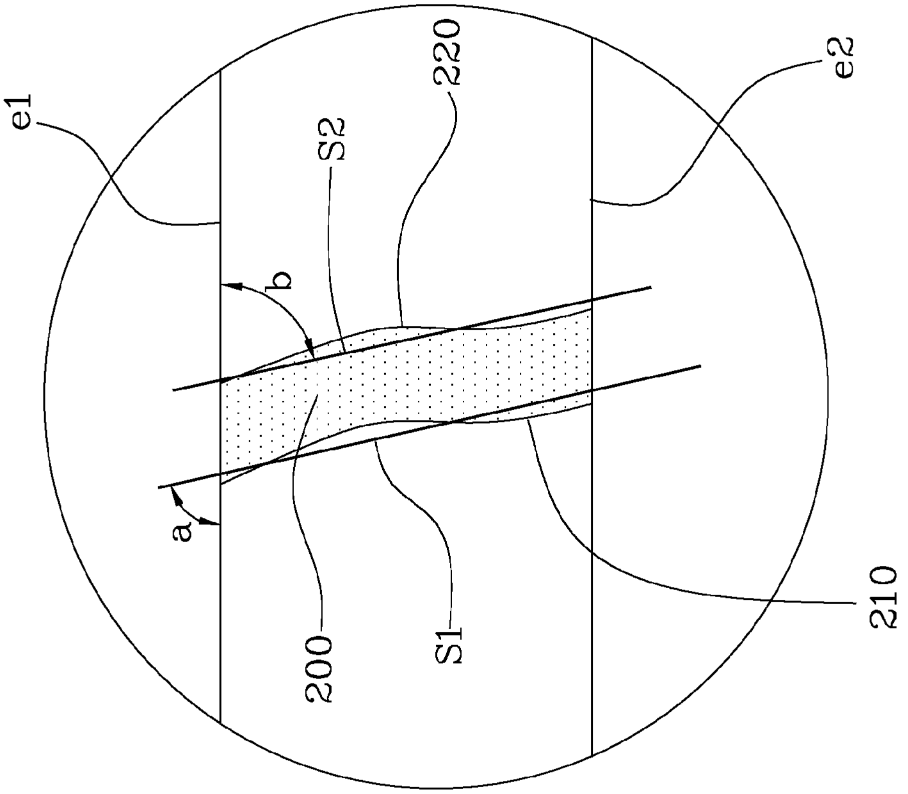
Figure 2C:
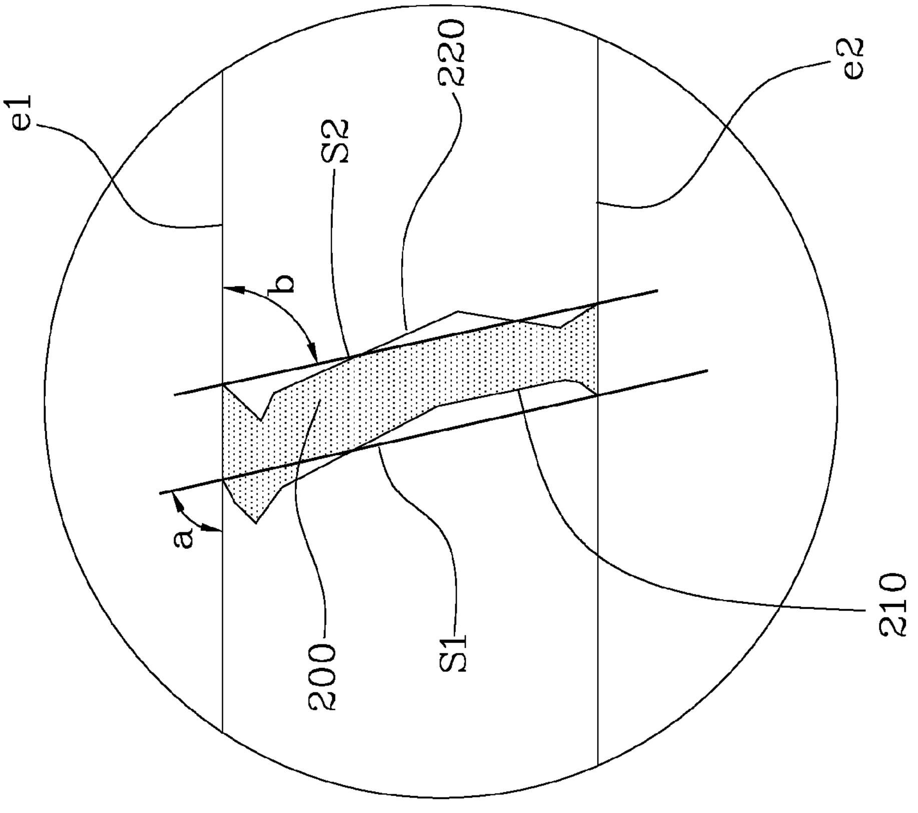
Figure 3:
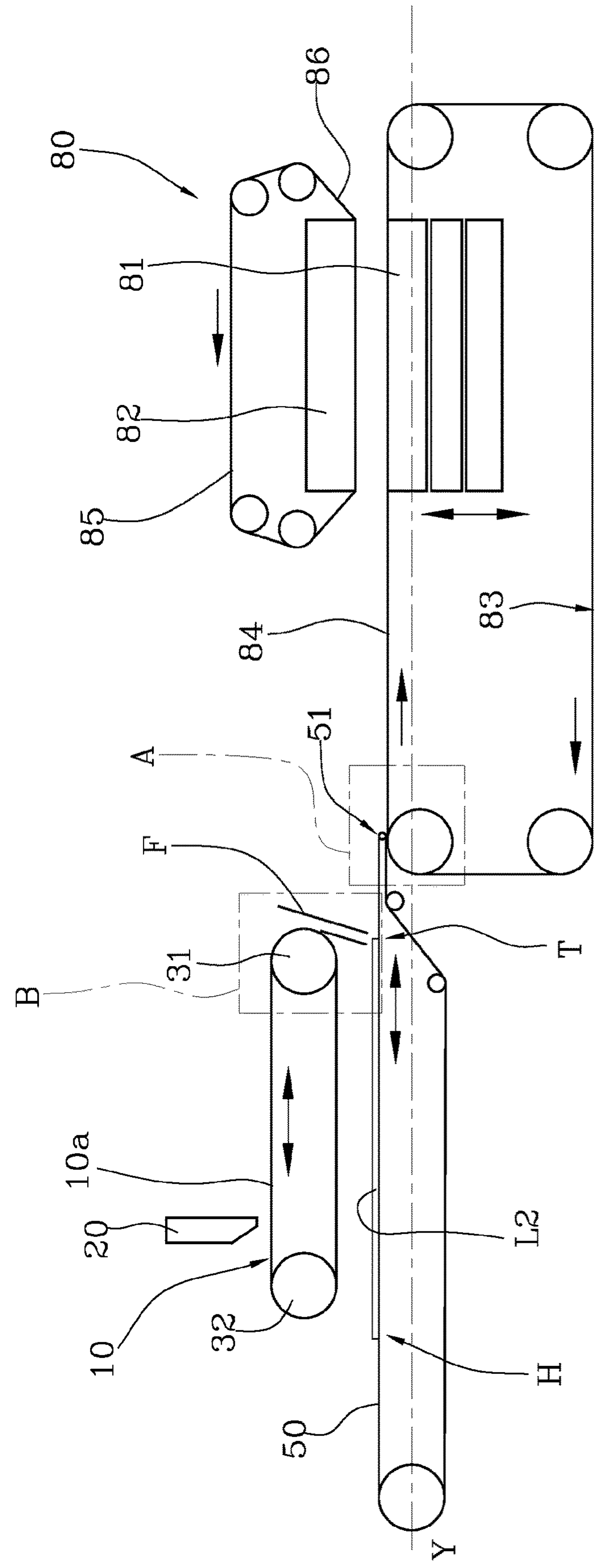
Figure 4:
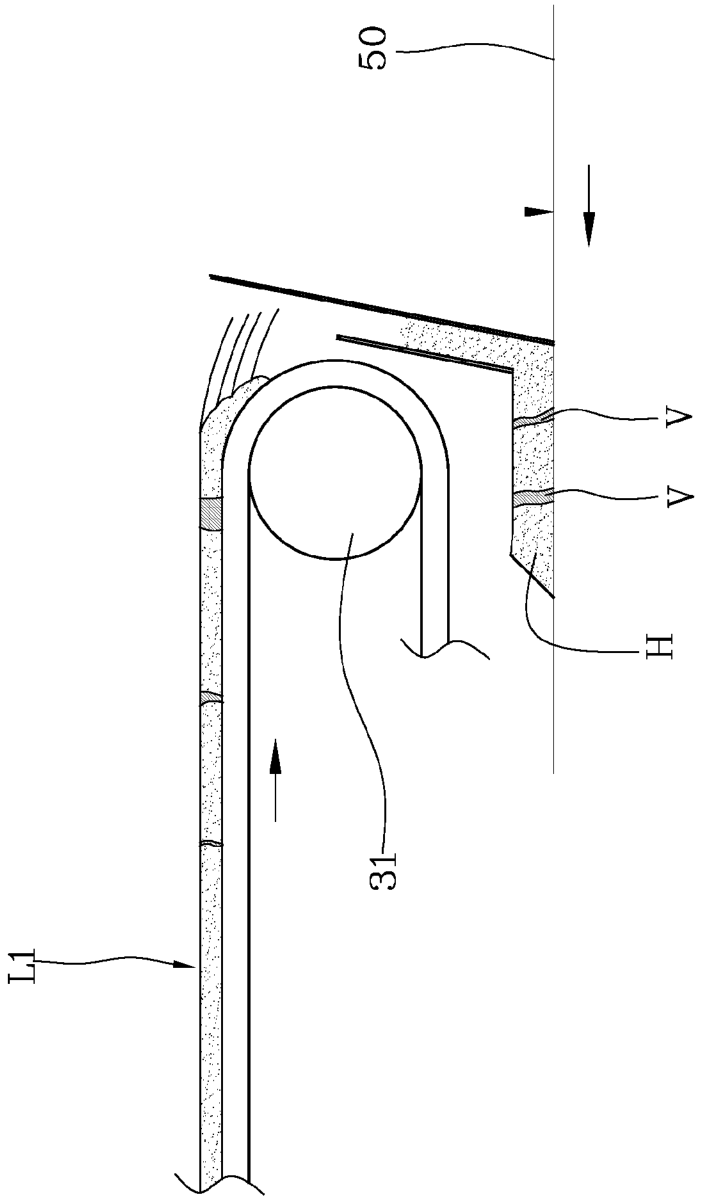
Figure 5:
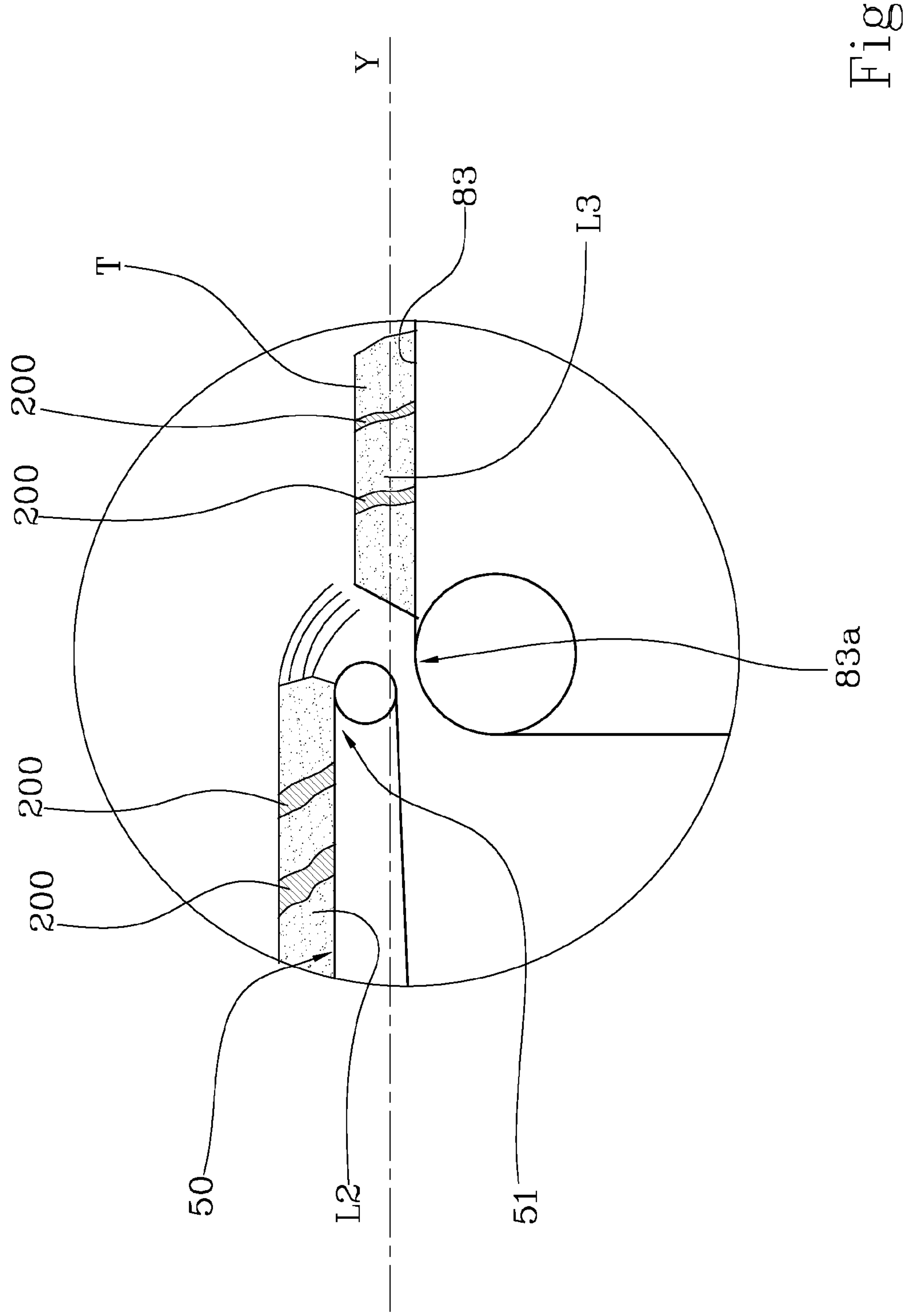

FIG. 2*a* is a first enlargement of the view of FIG. 2;

FIG. 2*b* is a second enlargement of the view of FIG. 2;

FIG. 2*c* is a further enlarged view of a side face of the tile of FIG. 1;

FIG. 3 is a schematic view of a machine which can be used for the production of the slab according to the present invention;

FIG. 4 is an enlargement of the area (B) of FIG. 3;

FIG. 5 is an enlargement of the area (A) of FIG. 3.

In the following description, ceramic slab means a product, realised with the well-known ceramic technology process which involves the essential steps of pressing a layer of granular or powdered ceramic material and the subsequent firing of the pressed layer, which has a flat and flattened slab shape.

The slab comprises a body (100), realised in ceramic material, which has a thickness (S) delimited by a first face (110) and by a second face (120), substantially flat and parallel to one another. The first face (110), also known as "face", is intended to remain exposed or visible after laying the slab. The second face (120), also known as "back side", is instead intended to come into contact with the laying surface of the slab. Normally the second face (120), after the installation of the slab for the intended use, remains substantially hidden.

Typically the thickness (S) has a much smaller extension than the linear dimensions of the faces (110,120). As an order of magnitude, the sides of the faces (110,120) can range from 10 cm to over 3 m, while the thickness is comprised between about 5 mm and 30 mm. The body (100) also comprises four side faces (130,140,150,160), perpendicular to the first and the second face (110,120).

The slab comprises at least one decoration (200), of a different colour and/or tone with respect to the body (100), which extends at least partly in the thickness (S) of the body (100) and at least partly on one of the two faces (110, 120).

The decoration (200) essentially comprises one or more areas of the body (100) which are coloured differently from the rest of the body (100). The different colouration can be obtained by laying ceramic materials of different composition and/or granulometry and/or colour. For example, the decoration (200) comprises one or more veinings or streaks.

The decoration (200) is delimited, on a sectional plane substantially perpendicular to the faces (110, 120), by at least a first edge (210) which transversely extends between the faces (110,120) along a main extension direction (S1); Substantially perpendicular means a sectional plane which forms an angle comprised between about 80° and 90° with respect to the faces (110, 120).

Preferably, the decoration (200) emerges on at least one of the side faces of the body (100), i.e., it is visible on at least one of the side faces of the body (100). In such a case, the aforementioned sectional plane is coplanar with the side face on which the decoration emerges, and the first edge (210) is also visible on the same side face.

The main extension direction (S1) of the first edge (210) is substantially a straight line which approximates the overall trend of the first edge (210) between the two faces (110,120). In other words, the main extension direction is that direction which the eye perceives when viewing the slab in a normal position of use, i.e., when the slab is placed with the two faces (110,120) lying substantially horizontal.

In a possible definition, the main extension direction (S1) can be defined as a straight line passing through two end points of the first edge (210), i.e., the ends of the first edge (210). For example, with reference to FIG. 2*b*, the main extension direction (S1) is a line passing through the points of intersection between the first edge (210) and the corners (e1, e2) of the side face on which the first edge (210) is arranged.

Alternatively, the extension direction (S1) of the first edge (210) is a statistical interpolation straight line between a given number of points belonging to the first edge (210). In a known manner, once the points to be considered of the first edge (210) have been defined, the statistical interpolation straight line can be calculated, using the least squares method, as:

$$y=mx+q,$$

where $$f(m, q) = \sum_{i=1}^{n}(mx_i + q - y_i)^2 \Rightarrow \text{minimum}$$

The extension direction (S1) can still be defined or calculated by other methods.

An inclination angle (b) is defined between the extension direction (S1) and a plane substantially parallel to the faces (110,120). Substantially parallel plane means a plane which forms an angle comprised between about 0° and 10° with respect to the faces (110,120).

Advantageously, in the ceramic slab obtained by the method according to the present invention, the inclination angle (a) is comprised between 40° and 80°. Within this range, the decoration (200) takes on the appearance of a natural veining, in particular a veining present in natural stones. Thereby, the side surfaces of the slab, when it is laid with at least one visible side surface, for example on a hob or on a step, also assume a natural appearance, consistent with the surface decoration which can be applied to the first face (110). Furthermore, an inclination angle (a) comprised in the range between 40° and 80° gives the decoration considerable stability during the course of the production cycle which leads to the realisation of the slab, starting from the laying of a decorated soft layer (L2) which will be better explained below. In particular, the decoration remains stable with respect to the displacements to which the decorated soft layer (L2) from which the slab is obtained is subjected, as well as with respect to the pressing step to which the decorated soft layer (L2) itself is subjected.

In other words, being able to modify the inclination with angles comprised between 40° and 80°, preferably comprised between 60° and 80°, for example 70°, allows to maintain a greater stability of the soft layer during the displacements of the soft layer required by the production cycle, as well as with respect to the pressing step to which the decorated soft layer (L2) is subjected. In other words, an inclination of the vein comprised between 40° and 80°, preferably between 60° and 80°, for example 70°, allows to obtain greater structural stability of the vein itself within the soft layer during the various displacements. Thereby the vein does not break down inside the soft layer during transport and the soft layer maintains the geometric features thereof.

Being able to select the inclination with angles greater than 40° also allows to obtain finished products with optical perception features more similar to natural stones or wood.

The applicant has found that, although the first edge (210) can have a winding or angled trend, if the inclination angle (a) of the main extension direction (S1) is comprised between 40° and 80°, the decoration (200) assumes a completely natural appearance, substantially similar to the appearance of a veining in a natural stone. With reference to the example shown in FIG. 2*c*, the main extension line (S1) of the first edge (210) is defined as passing through the ends of the first edge (210) itself, and assuming an inclination comprised between 40° and 80° gives the decoration (200) a completely natural appearance. A similar remark can be made for a second edge (220) of the decoration (200).

More preferably, the inclination angle (b) is comprised between 60° and 80°. The inclination angle (a) is therefore relatively high, without being vertical. In this case, the effect obtained is a greater naturalness of the decoration, which assumes an almost indistinguishable appearance from the veining of a natural stone, when the slab is arranged in normal use conditions, i.e., laid with the faces (110,120) thereof lying on a substantially horizontal plane. Furthermore, an inclination angle (a) comprised in the range between 60° and 80°, further increases the stability of the decoration during the course of the production cycle which leads to the realisation of the slab. In particular, the decoration remains even more stable with respect to the displacements to which the decorated soft layer (L2) from which the slab is obtained is subjected, as well as with respect to the pressing step to which the decorated soft layer (L2) itself is subjected.

Even more preferably, the inclination angle (b) is comprised between 65° and 75°. In this range, the technical effects and advantages described above are further increased. For example, the inclination angle (a) is about 70°.

In a further possible embodiment, the decoration (200) is delimited, on a sectional plane perpendicular to the faces (110,120), by a second edge (220) which transversely extends between the faces (110,120) along a main extension direction (S2). In this case, the decoration (200) assumes the appearance of a more defined veining with respect to the previous case.

The main extension direction (S2) of the second edge (220) can be defined in the manners already described in relation to the main extension direction (S1) of the first edge (210). If the decoration (200) emerges on at least one of the side faces of the body (100), i.e., it is visible on at least one of the side faces of the body (100), the second edge (220) is also visible on the same face.

A second inclination angle (b) is defined between the extension direction (S2) and a plane parallel to the faces (110,120). Even such a second inclination angle (b) is comprised between 40° and 80°. The advantages offered by an inclination comprised within the indicated range are the same as those already underlined with reference to the first edge (210). Preferably, the second inclination angle (b) is comprised between 60° and 80°. Such an inclination gives the slab an appearance which is even more similar to natural stone. Furthermore, for the same reasons already stated in relation to the main extension direction (S1) of the first edge (210), an inclination angle (b) comprised between 60° and 80° gives the decoration even greater stability during the course of the production cycle to lead to the realisation of the slab, in particular, with respect to the displacements to which the decorated soft layer (L2) from which the plate is obtained is subjected, as well as with respect to the pressing step to which the decorated soft layer (L2) itself is subjected. Even more preferably, the inclination angle (b) is comprised between 65° and 75°. In this range, the technical effects and advantages described above are further increased. For example, the inclination angle (b) is about 70°.

It should be noted that a further element which distinguishes an artificial decoration from a natural decoration present in a natural stone is the high definition of the edges (210,220). In fact, in artificial decorations such edges are clean and without any shading gradient towards the part of the stone adjacent to the decoration (200) itself.

A feature which is perceived in the decoration (200) according to the present invention consists in having edges (210, 220) with a minimum shading gradient, making the observer feel as if they are in front of a natural stone. Advantageously, the main extension directions (S1,S2) can be substantially parallel or convergent or divergent. In fact, the Applicant has observed that the natural appearance of the decoration (200) is maintained regardless of the mutual inclination between the main extension directions (S1,S2), when the inclination angle (a,b) of each thereof is comprised between 40° and 80°.

The advantageous inclinations for the extension directions (S1,S2) of the edges (110,120) of the decoration (200) of the slab obtained by the method according to the present invention are obtainable by virtue of the implementation of a production method devised by the applicant.

The method envisages arranging, on a first deposition plane (50), a decorated layer (L2) of granular or powdered ceramic material, provided with a decoration (200), gradually depositing the decorated layer (L2) from a head (H) to a tail (T).

The head (H) is formed by the material which is deposited first on the first deposition plane (50). The tail (T) is formed by the material which is deposited last on the first deposition plane (50). In the example illustrated in FIG. 4, the deposition of the decorated layer (L2) occurs with the first deposition plane (50) moving along a longitudinal direction (Y), from right to left. Merely by way of example, the first deposition plane (50), during the laying of the decorated layer (L2), moves with a speed comprised between 0.5 and 3 metres per minute.

In general, given the granulometric features of the ceramic materials normally used, in the speed range indicated above the decoration (200) on the first deposition plane (50) assumes inclination angles (a,b) close to about 30°. Such an inclination angle is the inclination angle of the decoration (200) before the pressing step.

The method subsequently envisages transferring the decorated layer (L2) from the first deposition plane (50) to a second deposition plane (83), located at a lower height than the first deposition plane (50). The decorated layer (L2) is transferred starting from the tail (T). In other words, the tail (T) of the decorated layer (L2) is first deposited on the second deposition plane (83). With reference to the illustrated exemplary embodiment, the transfer of the decorated layer (L2) from the first deposition plane (50) to the second deposition plane (83) occurs in a left-to-right direction, as diagrammed in FIG. 5. In other words, during the deposition of the soft layer (L2), the first deposition plane (50) is moving along a longitudinal direction (Y) in the opposite direction with respect to the transfer step to the second deposition plane (83).

The deposition of the decorated layer (L2) on the first deposition plane (50), while the latter is moving, produces a displacement of the material along the longitudinal direction (Y) which is not equal along the thickness of the decorated layer (L2). In essence, due to such a relative motion, a decoration which should assume a certain inclination instead undergoes a backward inclination deviation, with respect to the advancement direction of the first deposition plane (50).

The transfer of the decorated layer (L2) from the first deposition plane (50) to the second deposition plane (83), which occurs starting from the tail (T), produces a displacement of the material along the longitudinal direction (Y) opposite to the previous one. This then allows the inclination of the decoration (200) to be modified, as schematically shown in FIG. 5. In other words, the transfer of the decorated layer (L2) from the tail (T) allows to modify or correct the inclination of the decoration (200), producing an effect contrary to the cause which produced the deviation of the decoration (200) during the deposition on the first deposition plane (50).

In essence, the decorated layer (L2) is deposited on the first decoration plane (50) starting from the head (H) down to the tail (T). In the solution depicted, this transfer is carried out while the first deposition plane (50) is moving from right to left. Once the deposition of the decorated layer (L2) is completed, the motion of the first deposition plane (50) is reversed and the second decorated layer (L2) is transferred to the second deposition plane (83), which moves in a direction consistent with the first deposition plane (50). Thereby, the tail (T) of the decorated layer (L2) is the first to be transferred and deposited on the second deposition plane (83).

The inclination of the decoration (200), i.e., the inclination angle (a) of the main extension direction (S1) of the first edge (210) and the inclination angle (b) of the main extension direction (S2) of the second edge (220), as obtained on the second deposition plane (83) following the transfer from the first deposition plane (50) to the second deposition plane (83), allow to obtain, in the finished product, inclination angles comprised between 40° and 80°, or more preferably comprised between 60° and 80°, or even more comprised preferably between 65° and 75°, compensating for the effects of pressing and keeping the decoration (200) itself stable, which, apart from the aforementioned inclination correction, does not undergo further deformation.

In fact, the pressing step produces a variation of the inclination angles (a,b) of the main extension directions (S1,S2). In particular, the pressing reduces the inclination angles (a,b). Such a variation can be substantially anticipated and compensated through the correction of the inclination angles (a,b) made with the transfer from the first deposition plane (50) to the second deposition plane (83).

By varying the ratio between the speeds of the two deposition planes (50,83), it is possible to further intervene on the inclination angles (a,b) of the main extension directions (S1,S2), as well as it is possible to modify the thickness of the second layer (L3).

Preferably, the speeds of the first and the second deposition plane (50,83) are in a predefined ratio. Such a ratio is chosen as a function of the structure of the decoration (200).

More preferably, the speed of the second deposition plane (83) is comprised between about half and double the speed of the first deposition plane (50).

Merely by way of example, preferably the advancement speeds of the first deposition plane (50) and the second deposition plane (83), during the step of transferring the decorated layer (L2) from the first to the second, are comprised between 30 and 50 metres per minute.

In other words, the ratio between the two speeds is preset in relation to the inclination angles (a,b) which are intended to be assigned to the main extension directions (S1,S2) and the thickness which is to be conferred to the second layer (L3).

Of course, it is also possible that the desired inclination angles (a,b) of the main extension directions (S1,S2) are obtained with the speeds of the first and the second deposition plane (50, 83) substantially equal to each other during the transfer step. In this case, the thickness of the second layer (L3) remains unchanged.

A further control parameter which can be used, although not necessarily, to vary the inclination angles (a,b), is the speed of the first decoration plane (50) during the deposition of the decorated layer (L2).

The speed of the first deposition plane (50) during the deposition of the decorated layer (L2) affects, to some extent, the inclination angles (a,b) of the main extension directions (S1,S2), as well as the thickness of the decorated layer (L2). In the embodiment depicted, changing the speed of the first deposition plane (50) during the laying of the decorated layer (L2) allows to change the inclination angles (a,b) of the main extension directions (S1,S2), in addition to the thickness of the decorated layer (L2).

As already indicated, during the step of depositing the decorated layer (L2), the first deposition plane (50) is moving along a longitudinal direction (Y) in the opposite direction with respect to the transfer step to the second deposition plane (83). Advantageously, the first deposition plane (50) can be operated at different speeds, in modulus as well as in verse, during the step of depositing the decorated layer (L2) and during the transfer step to the second deposition plane (83). This allows a further degree of control of the inclination angles (a,b) of the main extension directions (S1,S2), a further degree of control which can be useful to improve the accuracy of the obtained result.

Preferably, the first deposition plane (50) is movable with a lower speed during the step of depositing the decorated layer (L2) and with a higher speed during the transfer step.

Even more preferably, the speed during the step of depositing the decorated layer (L2) is between 100 and 10 times lower than the speed during the transfer step to the second deposition plane (83). Thereby, the desired inclination angle (a,b) can be obtained with even more precision.

Merely by way of example, the speed of the first deposition plane (50) during the step of depositing the decorated layer (L2) is comprised between 0.5 and 3 metres per minute, while during the transfer step to the second deposition plane it is comprised between 30 and 50 metres per minute.

In a preferred embodiment of the method, the step of arranging the decorated layer (L2) on the first deposition plane (50) comprises a step of arranging, on a decoration plane (10), a first soft layer (L1) of granular or powdered ceramic material. The first layer (L1) is provided with the decoration (200).

The method subsequently envisages transferring the first layer (L1) from the decoration plane (10) to a first deposition plane (50), located at a lower height than the decoration plane (10). The transfer occurs by gradual deposition, as diagrammed in FIG. 4. In essence, the gradual transfer causes the deposition of the first layer (L1) on the first deposition plane (50), gradually forming a decorated layer (L2) having a head (H) and a tail (T).

In an alternative embodiment, not illustrated, the deposition of the decorated layer (L2) on the first deposition plane (50) occurs by means of another type of distributing device, capable of dispensing the ceramic product towards the deposition plane (50), in a controlled manner.

In the illustrated embodiment, the decoration plane (10) is in the form of a flexible belt, movable along a closed path which turns around a pair of rollers (31,32). Along the path defined by the rollers (31,32), the decoration plane (10) has an upper section (10*a*), along which it slides forwards along the longitudinal direction (Y) and along which the first layer (L1) can be laid. In the section turning around a front roller (31), the first layer (L1) gradually flows downwards on the first deposition plane (50), forming the decorated layer (L2) starting from the head area (H) to the tail area (T). In the solution depicted, the first deposition plane (50) is movable along the longitudinal direction (Y) in the opposite direction with respect to the upper section (10*a*) of the decoration plane. Other solutions would be possible in which the motions of the decoration plane (10) and the deposition plane (50) are in agreement, or in which the deposition plane (50) is stationary and the decoration plane (10), in addition to sliding along the longitudinal direction (Y), is also movable with respect to the deposition plane (50) along the longitudinal direction (Y).

Preferably, but not necessarily, an accumulation container (F) is interposed between the decoration plane (10) and the first deposition plane (50), as diagrammed in FIG. 4. The accumulation container (F) comprises an unloading opening (O) arranged to allow the deposit of the ceramic compound on the first deposition plane (50). The interposition of the accumulation container (F) between the decoration plane (10) and the deposition plane (50) favours the maintenance of the structure of the decoration (200).

Before depositing on the deposition plane (50), the ceramic compound coming from the decoration plane (10) passes through the accumulation container (F). The transit towards the first deposition plane (50) is therefore not direct, but the ceramic compound temporarily accumulates inside the accumulation container (F) before depositing on the first deposition plane (50). The amount of compound which accumulates inside the container (F) substantially depends on the area of the unloading opening (O) and the flow rate of compound unloaded from the decoration plane (10).

The transfer of the decorated layer (L) from the first deposition plane (50) to the second deposition plane (83) preferably occurs according to the solution described in the publication WO2017051275. According to such a solution, the first deposition plane (50) is substantially aligned and contiguous, at a higher height, with respect to the second deposition plane (83).

As can be seen in FIG. 1, the first deposition plane (50) comprises a front end (51) which defines an end portion at which the first deposition plane (50) defines a return curve. Such a front end (51) is at least partly overlying a rear end (83*a*) of the second deposition plane (83). By operating in the first deposition plane (50) and the second deposition plane (83) in agreed advancement, i.e., in the same advancement direction, the second decorated layer (L2) is transferred from the first deposition plane (50) to the second deposition plane (83) performing a modest jump downwards at the front end (51) of the deposition plane (50) and gradually forming the second layer (L3). The deposition plane (50) and the movable plane (83) are movable independently of each other, i.e., each of them is provided with motor means thereof operable independently of the other.

The machine comprises first motor means, arranged to realise a first relative motion, between the decoration plane (10) and the first deposition plane (50), directed along a longitudinal direction (Y). The machine further comprises second motor means, arranged to realise a second relative motion, between the first deposition plane (50) and the second deposition plane (83), directed along the longitudinal direction (Y). The first and the second motor means can be operated independently of each other.

The decoration plane (10) comprises a plurality of cavities of predetermined shape and depth or height. Each of such cavities has an opening which allows the entry of the powdered material and a subsequent unloading of the powdered material previously introduced. Each cavity is delimited by a side wall and a bottom which can be substantially flat or curved.

The decoration plane (10) can be realised in the form of a flat element, in whose thickness the cavities are obtained. Alternatively, the cavities can be structured in a manner such that they can be applied to decoration plane (10). In a possible embodiment, the decoration plane (10) comprises a layer of flexible material, for example a rubber or plastic material, in whose thickness the cavities are obtained. In a particularly advantageous embodiment, the decoration plane (10) comprises a flexible belt on which the cavities are obtained, which open onto the surface of the belt itself.

Preferably, but not necessarily, the cavities are mutually identical and are distributed in a regular manner on the decoration plane (10). The cavities are adjacent to each other along the sides thereof, so as to be separated by a relatively thin edge. In other words, each of the cavities defines a volume suitable to receive a predetermined amount of powdered material for the decoration to be realised. Each cavity can be filled in an independent manner from the others.

In the illustrated, preferred but not exclusive embodiment, the decoration plane (10) is in the form of a flexible belt, closed in a loop around a pair of rollers (31,32). The cavities face towards the outside of such a closed path. Along the path defined by the rollers (31,32), the decoration plane (10) has an upper section (10*a*), along which it slides advancing along the longitudinal direction (Y) and along which the cavities face upwards, in the loading position. The dispensing device (20) can be placed at the top of the decoration plane (10), i.e., above the upper section of the decoration plane (10), so as to be able to unload the powdered material downwards and towards the cavities.

The loading of the cavities occurs during an advancement motion of the decoration plane (10) along the longitudinal direction (Y). In essence, while the decoration plane (10) advances, the dispensing device (20), by means of unloading openings or nozzles, sends the powdered material to the cavities in a selective and targeted manner. This allows to send the powdered material, contained in the dispensing device, towards predetermined cavities, and not towards others.

As already indicated, the rollers (31,32) cause the decoration plane (10) to slide along a closed path so as to gradually displace the cavities from the loading position to the unloading position. In the passage from the loading position to the unloading position, the cavities pass from a position in which they are facing upwards to a position in which they are facing downwards. During such a passage, each cavity can pour the content thereof downwards. As schematically shown in FIG. 4, the passage of the cavities from the loading position to the unloading position gradually occurs along the section of the decoration plane (10) which turns around a first roller (31). When each cavity is located facing downwards, i.e., after having travelled around the first roller (31), the pouring of the content is substantially complete. By turning around the second roller (32), the cavities move back into the loading position, to receive a new load of powdered material.

In the solution depicted, the first deposition plane (50) is placed below the decoration plane (10), for receiving the powdered material unloaded by the cavities. A relative movement is provided between the decoration plane (10) and the first deposition plane (50) which is directed along the longitudinal direction (Y), which occurs at the same time as the unloading of the powdered material from the cavities. This allows to deposit the powdered material, unloaded from the cavities, in a continuous layer (L2) on the first deposition plane (50).

In a preferred embodiment, the relative movement between the first deposition plane (50) and the decoration plane (10) is obtained by sliding the first deposition plane (50) along the longitudinal direction (Y), while the decoration plane (10), despite being slidable along the path thereof around the rollers (31,32), is on the whole static along the direction (Y). The sliding of the first deposition plane (50) can be in the same direction or in the opposite direction with respect to the sliding of the upper section of the decoration plane (10) in the motion thereof around the rollers (31,32). Preferably, but not necessarily, the first deposition plane (50) is in the form of a belt slidably movable along a closed path defined by two or more rollers, as shown in FIG. 1.

Preferably, a control processor is arranged to control the dispensing device (20) so as to fill the cavities in relation to the decoration (200) which is to be realised in the layer (L1). To this end, the control processor is provided with an algorithm which allows to process an image of the decoration (200) to break it down into a series of volumes of powdered material, of predetermined colour, each of which is attributed to a predetermined cavity. The control processor then adjusts the operation of the dispensing device (20) so that each volume is introduced into a predetermined cavity. The correspondence between each volume and a respective cavity is established by making known to the control processor the position of each cavity, the speed of the decoration plane (10) and the speed of the first deposition plane (50), for example by means of an encoder, sensors or optical systems known in the sector. In essence, starting from the decoration (200) which is to be realised, the control processor defines the number and the position of the volumes of material necessary to obtain it, and attributes each volume to a cavity, in relation to the position in which the volume contained in the cavity will be unloaded on the first deposition plane (50).

The second deposition plane (83) can be used to lead the decorated soft layer (L3) to a press (80). For example, the press (80) is in the form of a belt press, known in the sector for pressing large-format slabs. A press of this type comprises a bottom pad (81), provided with a pressing surface facing upwards. A top pad (82), provided with a pressing surface facing downwards, is located above the bottom pad. At least one of the two pads is movable nearingly and distancingly to and from the other in order to carry out a pressing of a layer (L3) of powdered ceramic material. The press further comprises a movable plane (83), in the form of a flexible belt, which has an active section (84) arranged at least partially between the top pad (82) and the bottom pad (81). The press further comprises a second movable plane (85), in the form of a flexible belt, which has an active section (86) arranged between the active section (84) of the first movable belt (83) and the top pad (82).

After the pressing, the slabs can be sent to a furnace for the firing step.

The invention claimed is:

1. A method for making a ceramic slab, comprising the following steps:

arranging on a first deposition plane a decorated soft layer provided with a decoration which is an inclined vein in a thickness of the decorated layer, depositing the decorated soft layer from a head to a tail;

transferring the decorated soft layer by deposition from the first deposition plan to a second deposition plane, placed at a lower height than the first deposition plane, starting from the tail of the decorated soft layer, making a second layer on the second deposition plane.

2. The method according to claim 1, wherein, during the deposition of the decorated soft layer, the first deposition plane is moving along a longitudinal direction in the opposite direction with respect to the transfer step to the second deposition plane.

3. The method according to claim 1, wherein the speed of the first deposition plane during the step of depositing the decorated soft layer is lower than the speed during the step of transferring the decorated soft layer from the first deposition plane to the second deposition plane.

4. The method according to claim 3, wherein the speed of the first deposition plane during the step of depositing the decorated soft layer is between 100 and 10 times lower than the speed during the step of transferring the decorated soft layer from the first deposition plane to the second deposition plane.

5. The method according to claim 4, wherein, during the transfer of the decorated soft layer from the first deposition plane to the second deposition plane, the first deposition plane and the second deposition plane are moving along a longitudinal direction with respective speeds.

6. The method according to claim 5, wherein the speeds of the first and the second deposition plane are configured to operate in a predefined ratio.

7. The method according to claim 6, wherein the speed of the second deposition plane is between half and double the speed of the first deposition plane.

8. The method according to claim 1, wherein the step of depositing the decorated soft layer provided with the decoration on the first deposition plane comprises the following steps:

arranging the first decorated soft layer on a decoration plane; and transferring the first layer from the decoration plane to the first deposition plane, placed at a lower height with respect to the decoration plane.

9. The method according to claim 2, wherein the speed of the first deposition plane during the step of depositing the decorated soft layer is lower than the speed during the step of transferring the decorated soft layer from the first deposition plane to the second deposition plane.

* * * * *